Nov. 15, 1960   J. S. COLLMAN ET AL   2,960,306
TURBINE

Filed Jan. 16, 1956   3 Sheets-Sheet 1

INVENTORS
John S. Collman &
BY James M. Ricketts
Paul Shiffnick
ATTORNEY

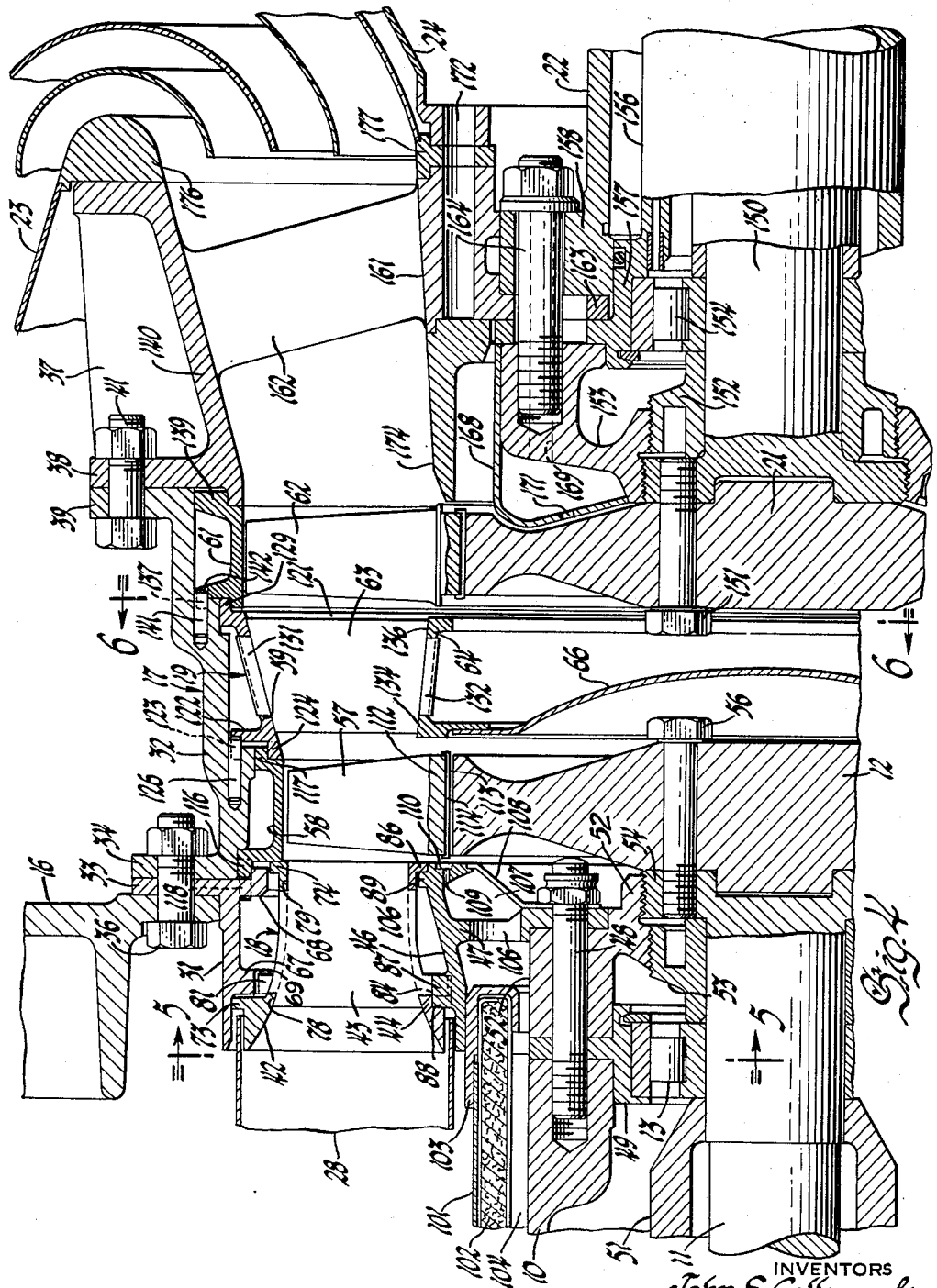

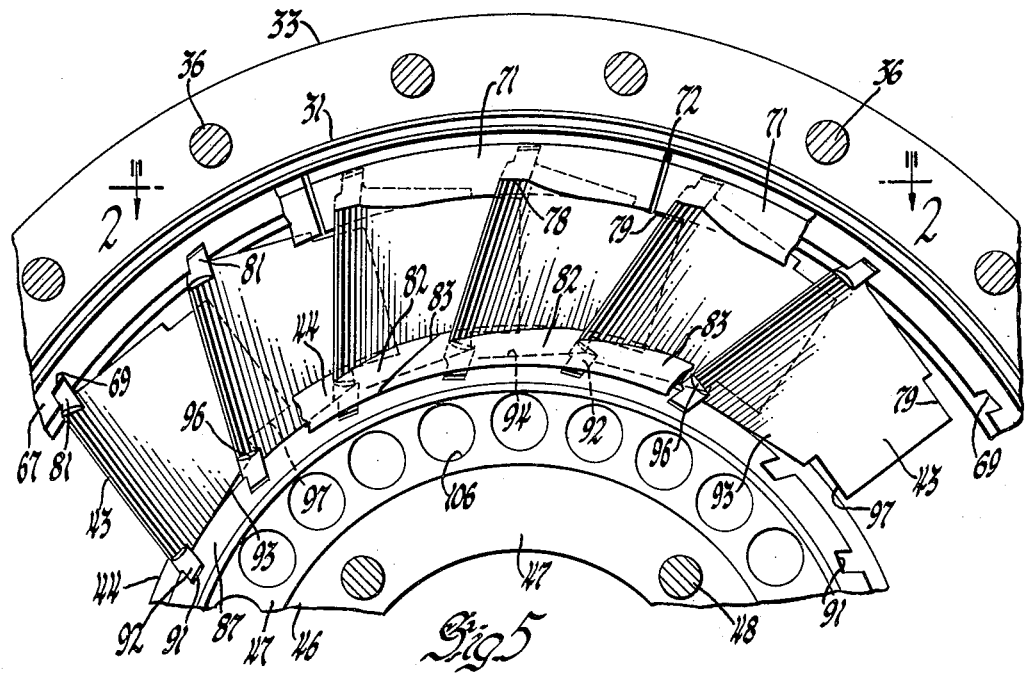
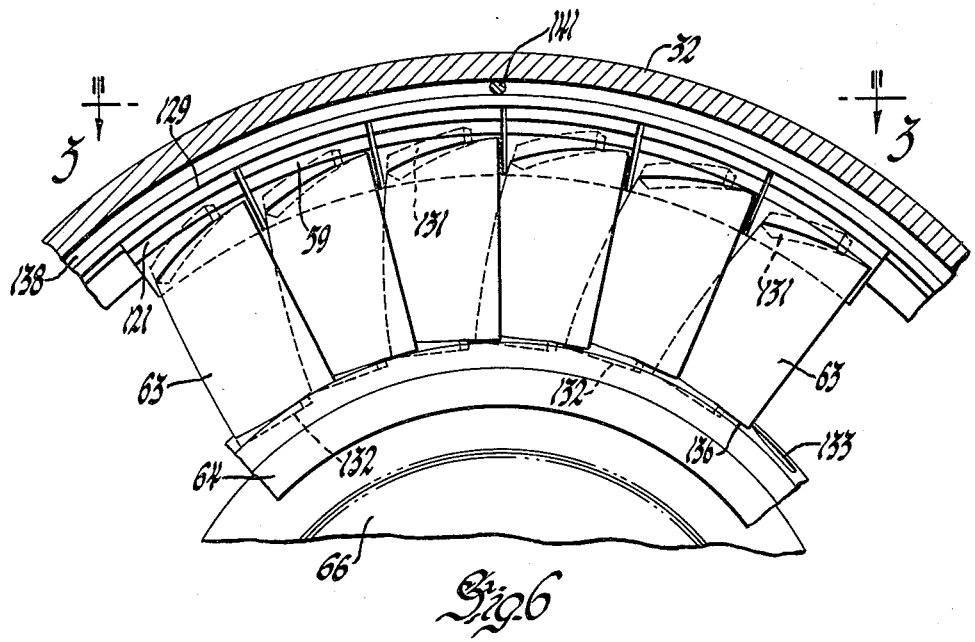

United States Patent Office 2,960,306
Patented Nov. 15, 1960

2,960,306

TURBINE

John S. Collman, Detroit, and James M. Ricketts, Oxford, Mich., assignors to General Motors Corporation, Detroit, Mich., a corporation of Delaware Filed Jan. 16, 1956, Ser. No. 559,176

5 Claims. (Cl. 253—78)

This invention relates to turbines and is particularly concerned with improved structure for the stators or casings, shrouds, and nozzles of turbines. The principal objects of the invention are to provide an improved turbine, and a turbine stator which is primarily composed of loose parts which may be fitted together and interlocked so that the parts are adequately supported but may expand and contract relative to each other so as to prevent development of harmful thermal stresses. Another object of the invention is to provide an economical and readily assembled turbine structure.

The nature of the invention and the advantages thereof will be apparent to those skilled in the art from the succeeding detailed description of the preferred embodiment and the accompanying drawings in which:

Figure 4 is a longitudinal sectional view of the turbine;

Figure 5 is a cross-sectional view of the first stage nozzle taken on the plane indicated by the line 5—5 in Figure 4; and Figure 6 is a cross-sectional view of the second stage nozzle taken on the plane indicated by the line 6—6 in Figure 4.

Figure 1:
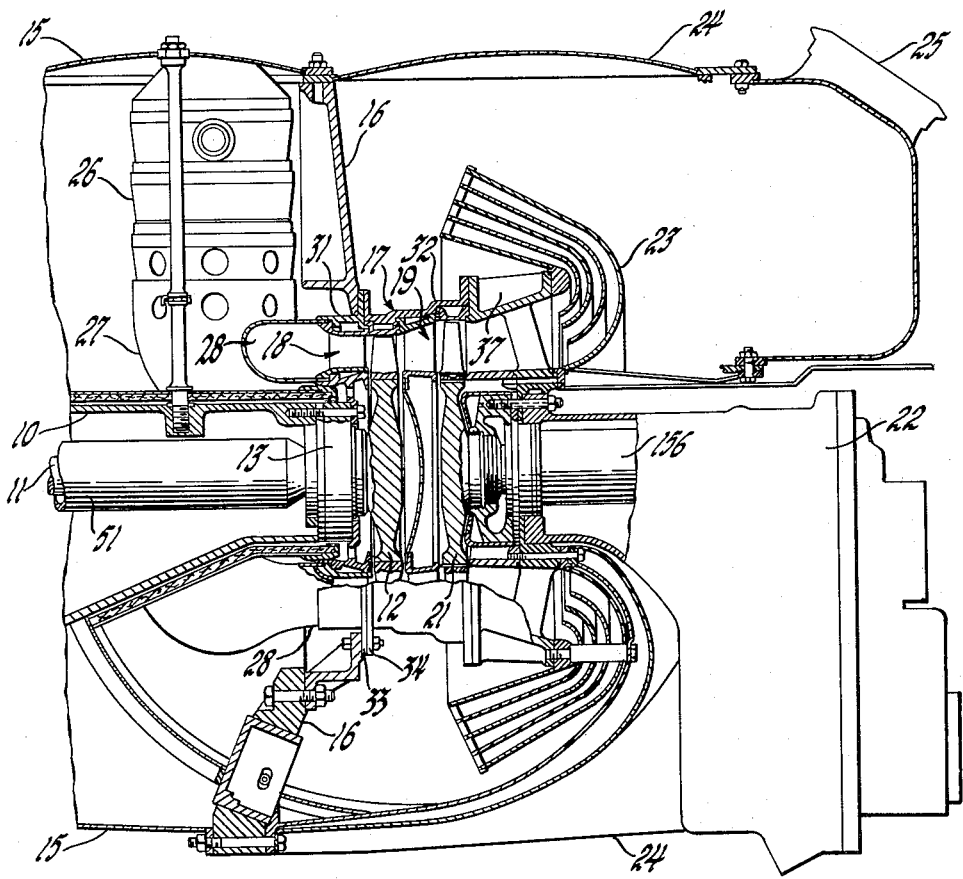
Figure 1 is a partial longitudinal sectional view of a gas turbine engine incorporating a turbine according to the invention.
Figure 2:
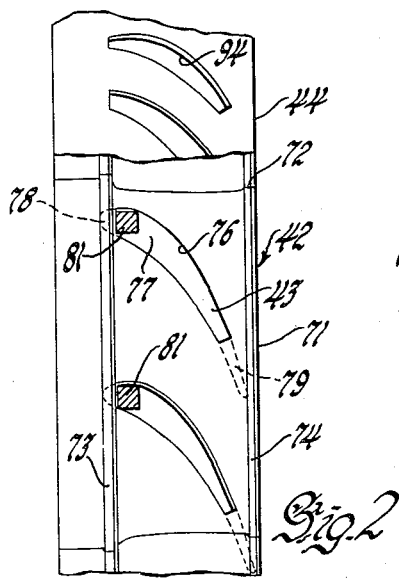
Figure 2 is an external view of the first stage turbine nozzle taken on the plane indicated by the line 2—2 in Figure 5.

While the principles of the invention are applicable to turbines of various configurations for various installations, the invention is shown and described herein in its preferred embodiment in an automotive gas turbine engine. The engine as a whole is the subject matter of application No. 559,475, Regenerative Gas Turbine, filed January 16, 1956. Since the turbine structure may be understood without reference to many of the details of the engine, these are omitted from the present specification and drawings in the interest of conciseness. However, by way of background, some parts of the engine structure apart from the turbine are shown in Figure 1. The lower part of this figure is a vertical section of the rear part of the engine and the upper part of the figure is a horizontal section.

The engine is of a regenerative type with gas-coupled turbines. The first turbine wheel drives a compressor which supplies compressed air through a regenerator to combustion chambers which discharge through the nozzle of the first turbine. A second turbine nozzle and turbine wheel downstream of the first turbine in the motive fluid path provide the power output and discharge the motive fluid through the regenerator to the exhaust.

Referring to Figure 1, the compressor and regenerators are not illustrated. The engine comprises an internal frame or shaft support 10 connected to the compressor case which supports a gasifier turbine shaft 11 on which is mounted the first turbine wheel 12. The shaft is supported in a roller bearing 13 adjacent the turbine and a forward bearing adjacent the compressor (not shown). The engine also has an outer frame or case identified generally as 15, the individual parts of which need not be identified, which connects the case of the compressor and thus the shaft housing 10 with a regenerator bulkhead or diaphragm 16 which is also a part of the engine frame. The turbine case identified generally as 17 is supported on and extends through the diaphragm. A first stage nozzle 18 and a second stage nozzle 19 are mounted in the case. A second or power turbine wheel 21 downstream of the second nozzle drives a power output shaft which extends into reduction gearing 22 fixed to the turbine case and which is suitably coupled to the driving wheels of a vehicle or other power consumer. The turbine exhausts through an annular recurved exhaust diffuser 23 into an exhaust collector 24 at each side of the engine from which the motive fluid is exhausted through exhaust outlets 25 and through other outlets not shown in the figure. The combustion gases are generated in combustion chambers 26 which discharge through two transition sections 27 which have semi-annular outlets 28 mounted on the first stage turbine nozzle. It is believed that the foregoing will provide a general understanding of the preferred environment of the invention, which is presented for orientation and not by way of restriction.

Referring now to Figure 4, and considering first the outer case 17 of the turbine, it will be noted that the diaphragm 16 has a central opening through which extends the first section of the turbine case which may be identified as the first stage nozzle outer shroud support 31. The second section of the case is the main case 32. The annular case portions 31 and 32 have flanges 33 and 34 respectively which abut the diaphragm 16 and are fixed thereon by bolts 36. The final or exhaust section of the turbine case is an externally ribbed annulus 37, the forward flange 38 of which is fixed to the rear flange 39 of the main case by bolts 41. The exhaust diffuser 23 bolts to the rear end of the exhaust section. The first stage nozzle comprises an outer shroud 42 mounted in the support 31, a number of generally radial flow-directing vanes 43, and an inner shroud 44. The inner shroud is mounted on a first stage nozzle inner shroud support 46 which comprises a flange 47 fixed by studs 48 to the rear end of the inner frame or shaft housing 10.

Studs 48 also pass through a radially extending flange of a cage 49 which supports the outer race of roller bearing 13, within which shaft 11 is rotatably mounted. A stiffening sleeve 51 is mounted on the shaft 11. Studs 48 also extend through the outer or fixed ring 52 of a front turbine labyrinth seal which cooperates with an inner seal ring 53 on shaft 11 and with the flange 54 at the end of the shaft. The exterior surface of ring 53 is grooved and the interior of the ring 52 is grooved where it cooperates with flange 54. The first turbine wheel 12 is piloted into the end of the shaft and fixed to it by bolts 56. The turbine wheel 12 bears blades 57 mounted in dovetail grooves in the rim of the wheel which receive the gases from the nozzle 18.

A segmented outer shroud ring 58 for this wheel is mounted in the main case between the first stage shroud 42 and the outer shroud 59 of the second nozzle 19. The rear edge of shroud 59 is abutted by a segmented shroud ring 61 for the second turbine wheel 21. This wheel bears blades 62. Vanes 63 extend inwardly from the outer shroud 59 to an unsegmented inner shroud ring 64 to which is welded or brazed a disk or diaphragm 66 closing the opening within the inner shroud.

The exhaust portion of the turbine and the rotating structure of the power turbine will be passed over for the present, pending more detailed description of the nozzles 18 and 19. The outer shroud support 31 has front and rear inwardly directed flanges 67 and 68 respectively, the latter of which includes a rearward projection which extends inside the forward flange of wheel shroud 58. The flange 67 has therein slots or keyways 69 extending axially of the engine. The outer shroud 42 is composed of a number of segments. In the particular structure here described, there are twenty vanes 43 and ten outer shroud segments 71 as shown in Figure 5, each of which cooperates with two of the vanes 43. A small gap 72 is provided between adjacent shroud segments to allow for thermal expansion. The shroud segments bear external flanges 73 near the forward edge which are piloted in the support 31 and flanges 74 at their rear edges which are piloted in the flange 68 of the support. The shroud is free to slide axially of the turbine to a limited extent in the support.

So far as the structure of the shroud segments 71 is concerned, they would also be free to move circumferentially of the support. However, they are held circumferentially by the vanes 43. Two holes 76 in each shroud segment receive tangs 77 which are continuations of the web of the vane 43. The tangs do not extend over the full chord of the vane, the leading and trailing edges of the vane providing abutments 78 and 79 which engage the inner surface of the shroud. A short key or projection 81 integral with each vane and extending outwardly from the forward edge of the tang 77 enters each keyway or opening 69.

The holes 76 are of the same configuration as the tang 77, with slight clearance, so that the vane is properly located by the shroud, and the keys 81 extending from the vanes hold both the vanes and the shroud segments against circumferential movement.

The inner shroud 44 is preferably composed of only two 180 degree segments, identified as 82, which abut with slight clearance gaps 83. These shroud segments have radially inwardly facing abutments 84 near the forward edge and a flange 86 near the rear edge which abut radially outwardly facing surfaces on the inner support 46. This support has a front flange 87, the forward face of which bears against a radial face 88 on the shroud segment and a second flange 89, the rear face of which bears against the flange 86 of the inner shroud. The inner shroud is thus mounted on the support 46 so as to be supported against inward or axial movement. The nozzle vanes 43 are fitted in holes in the inner shroud 44 and keyed into the flange 87 of the inner shroud support with the same structure as that just described for the outer shroud. This structure will, therefore, be described only briefly. Keyways 91 in the flange or rib 87 receive keys 92 extending from the inner end of vanes 43 adjacent the leading edge. Tangs 93 at the inner end of the vane extend through holes 94 in the inner shroud 44. Abutments 96 at the leading edge of the blade and 97 at the trailing edge bear against the outer surface of the shroud.

This nozzle may be readily assembled by the following procedure: The two segments of the inner shroud ring 44 are moved radially in to fit over the shroud support 46 with the holes 94 located circumferentially in register with keyways 91. Vanes 43 are then inserted into the holes 94 in the shroud with keys 92 in the keyways. The outer shroud segments 71 are then fitted over the outer ends of the vanes. The outer shroud support 31 may then be slid axially from the rear over the outer shroud. When the engine is assembled, the inner support is fitted over the studs 48 and the outer support is secured to the bulkhead 16 by bolts 36. It will be seen that this structure is not only well adapted to prevent damage from expansion of the parts but also that it is composed principally of small easily fabricated parts which may be very quickly and easily assembled or disassembled. The structure also provides for relative axial movement of the supports 31 and 46 which may result from differential expansion in the engine as a whole. A slight degree of radial clearance may be provided between the outer shroud and the outer support to accommodate radial expansion of the vanes, which ordinarily are much hotter than the supporting structure in the engine when it is in operation. It will be noted that the outlet portion 28 of the combustion chamber transition section 27 is received in spaces between the shrouds and their supports into which it slides.

The frame or support 10 is protected from the combustion chamber heat by a heat shield or blanket comprising a sheet metal sleeve 101 and an insulating blanket 102 mounted therein. A recurved flange 103 on the rear end of the sleeve holds the insulating blanket and pilots into the interior of the inner shroud support 46. The space 104 between the heat shield and the frame 10 defines a passage for a small amount of air supplied from the engine compressor which flows through holes 106 in the flange 47 of the nozzle support into a chamber 107 between the nozzle support and a heat shield disk 108. The holes 106 are closely spaced to provide a heat dam between the turbine nozzle and the frame 10. A number of small holes 109 through the rear flange of the nozzle support conduct this air into a groove 110 on the rear face of the nozzle support adjacent the rim of turbine wheel 12. The air thus supplied serves to exclude the motive fluid from the space ahead of the turbine wheel 12 and also to cool the rim of the wheel. The bases 112 of the blades 57 are spaced from the bottom of the blade grooves in the wheel to provide a shallow passage 113 below the blades through which some of this air can flow and exhaust into the motive fluid path through the gap between wheel 12 and shroud 64. The blades are retained on the wheel by sheet metal clips 114.

The outer shroud 58 for turbine wheel 12 preferably comprises three segments which are slightly spaced circumferentially to permit expansion of the shroud relative to the case 32. As will be apparent, the shroud has flanges 116 and 117 at the front and rear edges which pilot against surfaces in the case. The shroud may be slid into the case. Flange 116 fits over the rear flange 68 of the first nozzle outer support and flange 117 fits over the front end of the second nozzle outer shroud 59 to prevent the wheel shroud from moving inwardly and rubbing the tips of the blade 57. A dowel 118 mounted in a hole in the outer support 31 enters a notch in flange 116 of each segment to hold it against circumferential displacement.

Figure 3:
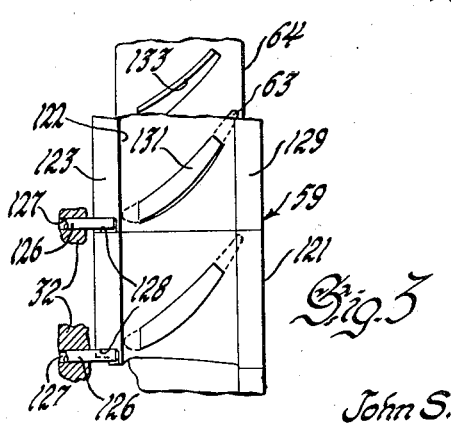
Figure 3 is a similar view of the second stage turbine nozzle taken on the plane indicated by the line 3—3 in Figure 6.

Proceeding to the second turbine nozzle 19, as previously stated this comprises an outer shroud 59, vanes 63, and an inner shroud 64 integral with disk 66. This structure is shown also on Figures 3 and 6. The outer shroud 59 comprises a number of segments 121, one for each vane 63. The shroud segments and vanes preferably are separately cast but are welded together so that each vane is integral with a segment of the shroud and is held in place by the mounting of the shroud in case 32. Each segment is approximately rectangular, as will be apparent from Figure 3, and has thereon near the forward edge a radially extending rib 122 which terminates in a forwardly extending flange 123. This flange pilots into a recess between the body of the main turbine case 32 and an axially extending flange 124 of the case. Pins or dowels 126 fitted in axially extending holes 127 in the case enter notches 128 in the flange 123 to hold the shroud segments against circumferential movement. The mounting of the flange 123 in the case and the fit of the forward edge of the shroud within the wheel shroud 58 prevent rocking or tilting of the vanes. The rear edge of the shroud defines a surface 129 which pilots within the case and fits over the forward edge of the second turbine wheel shroud 61. A tang 131 extending from the central part of the chord of each vane is fitted in a hole in the shroud segment and is welded or high temperature brazed therein. Tangs 132 extending from the central portion of the chord of the inner end of each vane 63 extend into holes 133 in the continuous annular inner shroud 64, thus supporting the inner shroud from the case through the outer shroud and vanes. Abutments 134 and 136 at the leading and trailing edges of the inner ends of the vanes bear against the outer surface of the shroud 64. Slight clearance may be provided between these abutments and the shroud to accommodate expansion. This nozzle may be assembled by inserting the vanes into the inner shroud and then sliding the assembly into the case.

The second turbine wheel shroud 61 is similar to the shroud 58. It comprises three segments which have outer flanges 137 fitting into a recess 138 in the case and rear flanges 139 which pilot into the case and over the forward edge of the outer exhaust duct wall 140 which is part of the exhaust duct 37. A dowel 141 mounted in a hole in the case engages a notch 142 in the central part of each segment to hold the shroud segments against rotation. The ends of the segments are separated by a slight gap to permit expansion.

Proceeding now to the power turbine wheel 21 and the structure by which it is mounted in the engine, wheel 21 is piloted within the end of a power output shaft 150 and fixed on the shaft by bolts 151. A flange on the end of shaft 150 and the outer surface of a seal ring 152 cooperate with a fixed outer labyrinth seal member 153. The shaft is supported by a roller bearing 154 adjacent the wheel and a second bearing (not shown) farther to the rear on the shaft. These bearings are mounted in a cylindrical cartridge 156 which pilots into the reduction gear case 22. The seal ring 153, a cage or support 157 for the bearing 154, and the forward flange 158 of the reduction gear case are supported in the turbine exhaust casing 37.

This casing has an outer wall 140 and an annular inner wall 161 connected by integral struts 162. A flange 163 extends inwardly from the inner wall 161. Studs 164 threaded into the labyrinth seal 153 pass through the flange of the bearing cage 157, flange 163, and flange 158, by means of which these parts are rigidly mounted together. It will be noted that the various parts pilot into each other and have abutting radial faces so that accurate alignment of the seal ring, bearing, and reduction gear is assured. A cup-shaped heat shield 168 fitted on the seal ring 153 has a face adjacent the rear face of turbine wheel 21. An air passage 169 through the outer margin of the seal ring 153 and the flanges of the other parts fixed thereto provides an external connection by which cooling air supplied from the engine compressor, or any suitable source, may be brought in to cool the labyrinth seals and the power turbine wheel. This air flows through a ring of small holes 171 in the face of the heat shield 168 and out through the space between the turbine wheel and the inner wall of the exhaust duct. The cooling air not only cools the wheel but tends to insulate the bearing 154 from the hot gases. The introduction of the cooling air also prevents leakage of combustion gases through the labyrinth seal. A passage 172, shown closed off by ring 174, may be completed through to provide for circulation of cooling air to the rear turbine bearing from an external source after the engine is shut down.

A ring 174 bolted to the forward face of the inner ring 161 of the exhaust duct provides part of the inner wall of the exhaust duct. The diffuser 23 has flanges 176 and 177 fixed by bolts (not shown) to the outer and inner walls of the exhaust duct. A portion of the outer case 24 bolts to the inner wall of the exhaust duct.

The operation of the engine will be apparent from the foregoing description. It will also be apparent that the embodiment of the invention here disclosed is a particularly desirable turbine structure and that the stator or nozzle structure of the invention is highly advantageous from the standpoints of ready fabrication and ability to stand up in service and allow for differential thermal expansion of the parts, which is always a problem with turbines which are subject to changes of temperature during starting and stopping and with changes of load.

The detailed description herein of the preferred embodiment of the invention is not to be construed as limited or restricting the invention, as many modifications may be made by exercise of skill in the art within the scope of the invention.

We claim:

1. A turbine nozzle comprising, in combination, an annular outer support, a circumferentially segmented outer shroud piloted in the outer support, an inner shroud, and nozzle vanes extending between the shrouds, the shrouds defining holes to receive the vanes and having opposed surfaces defining a fluid flow path through the nozzle, the vanes having tangs extending into the holes in the shrouds and slidably received in one of the shrouds to locate the vanes relative to the shrouds and abutments engaging the said surfaces of the shrouds to space the shrouds, the support and the outer shroud defining abutments facing axially of the support engaging to locate the shroud axially of the support, and abutments on the support and on the vane tangs facing circumferentially of the support engaging to locate the shroud circumferentially of the support.

2. A turbine nozzle comprising, in combination, an annular inner support, an annular outer support, the supports being structurally connected and having a common axis, a circumferentially segmented inner shroud piloted on the inner support, a circumferentially segmented outer shroud piloted in the outer support, and nozzle vanes extending between the shrouds, the shrouds defining holes to receive the vanes and having opposed surfaces defining a fluid flow path through the nozzle, the vanes having tangs slidably extending into the holes in the shrouds to locate the vanes relative to the shrouds and abutments engaging the said surfaces of the shrouds to space the shrouds, the supports defining openings therein, at least some of the vanes having projections extending from the ends thereof slidably into the openings in the supports to locate the vanes relative to the supports.

3. A turbine nozzle comprising, in combination, an annular inner support, an annular outer support, the supports being structurally connected and having a common axis, an inner shroud piloted on the inner support, a circumferentially segmented outer shroud piloted in the outer support, and nozzle vanes extending between the shrouds, the shrouds defining holes to receive the vanes and having opposed surfaces defining a fluid flow path through the nozzle, the vanes having tangs slidably extending into the holes in the shrouds to locate the vanes relative to the shrouds and abutments engaging the said surfaces of the shrouds to space the shrouds, one support defining axially extending keyways therein, at least some of the vanes having keys extending from an end thereof slidably into the keyways to locate the vanes circumferentially of the supports.

4. A turbine nozzle comprising, in combination, an annular inner support, an annular outer support, the supports being structurally connected and having a common axis, a circumferentially segmented inner shroud piloted on the inner support, a circumferentially segmented outer shroud piloted in the outer support, and nozzle vanes extending between the shrouds, the shrouds defining holes to receive the vanes and having opposed surfaces defining a fluid flow path through the nozzle, the vanes having tangs slidably extending into the holes in the shrouds to locate the vanes relative to the shrouds and abutments engaging the said surfaces of the shrouds to space the shrouds, the supports defining axially extending keyways therein, at least some of the vanes having keys extending from the ends thereof slidably into the keyways in the supports to locate the vanes circumferentially of the supports, and means connecting one shroud and its support operative to locate the shroud axially of the support.

5. A turbine nozzle comprising, in combination, an annular inner support, an annular outer support, the supports being structurally connected and having a common axis, a circumferentially segmented inner shroud piloted on the inner support, a circumferentially segmented outer shroud piloted in the outer support, and nozzle vanes extending between the shrouds, the shrouds defining holes to receive the vanes and having opposed surfaces defining a fluid flow path through the nozzle, the vanes having tangs slidably extending into the holes in the shrouds to locate the vanes relative to the shrouds and abutments engaging the said surfaces of the shrouds to space the shrouds, the supports defining axially extending keyways therein, at least some of the vanes having keys extending from the ends thereof slidably into the keyways in the supports to locate the vanes circumferentially of the supports, one support and the shroud thereon defining abutments facing axially of the support engaging to locate the shroud axially of the support, and the other shroud being axially slidable in the other support.

References Cited in the file of this patent

UNITED STATES PATENTS

| | | |
|---|---|---|
| 1,298,564 | Rice | Mar. 25, 1919 |
| 2,488,867 | Judson | Nov. 22, 1949 |
| 2,625,013 | Howard et al. | Jan. 13, 1953 |
| 2,640,319 | Wislicenus | June 2, 1953 |